US010633092B2

(12) United States Patent
Willford (10) Patent No.: US 10,633,092 B2
(45) Date of Patent: Apr. 28, 2020

(54) UAV WITH WING-PLATE ASSEMBLIES PROVIDING EFFICIENT VERTICAL TAKEOFF AND LANDING CAPABILITY

(71) Applicant: AAI Corporation, Hunt Valley, MD (US)

(72) Inventor: Neal H. Willford, Andover, KS (US)

(73) Assignee: AAI Corporation, Hunt Valley, MD (US)

( * ) Notice: Subject to any disclaimer, the term of this patent is extended or adjusted under 35 U.S.C. 154(b) by 250 days.

(21) Appl. No.: 15/370,592

(22) Filed: Dec. 6, 2016

(65) Prior Publication Data

US 2017/0158327 A1    Jun. 8, 2017

Related U.S. Application Data

(60) Provisional application No. 62/263,851, filed on Dec. 7, 2015.

(51) Int. Cl.
*B64C 27/50*    (2006.01)
*B64C 39/02*    (2006.01)
(Continued)

(52) U.S. Cl.
CPC ............ *B64C 39/024* (2013.01); *B64C 25/34* (2013.01); *B64C 27/50* (2013.01); *B64C 29/02* (2013.01);
(Continued)

(58) Field of Classification Search
CPC ... B64C 27/50; B64C 29/02; B64C 2201/021; B64C 2201/042; B64C 2201/088; B64C 2201/104; B64C 2201/108; G05D 1/0858
See application file for complete search history.

(56) References Cited

U.S. PATENT DOCUMENTS 3,142,455 A    7/1964  Wilford
5,094,412 A    3/1992  Narramore
(Continued)

FOREIGN PATENT DOCUMENTS

CN    204124364 U    1/2015
FR    2903380 A1    1/2008
FR    2942455 A1    8/2010

OTHER PUBLICATIONS

International Search Report for International Application No. PCT/US20161065148 mailed from the International Searching Authority (EPO) dated Sep. 11, 2017, 23 pages.
(Continued)

*Primary Examiner* — Philip J Bonzell
(74) *Attorney, Agent, or Firm* — BainwoodHuang (57) ABSTRACT

A technique is directed to operating an unmanned aerial vehicle (UAV) having a fuselage defining a flight direction of the UAV and wing-plate assemblies that propel the UAV in the flight direction defined by the fuselage. The technique involves providing, while the flight direction defined by fuselage of the UAV points vertically from a takeoff location on the ground, thrust from propulsion units of the wing-plate assemblies to fly the UAV along a vertical takeoff path. The technique further involves maneuvering, after the UAV flies along the vertical takeoff path, the UAV to align the flight direction along a horizontal flight path that is perpendicular to the vertical takeoff path. The technique further involves providing, after the UAV flies along the horizontal flight path, thrust from the propulsion units of the wing-plate assemblies to land the UAV along a vertical landing path that is perpendicular to the horizontal flight path.

22 Claims, 7 Drawing Sheets

(51) Int. Cl.
*B64C 25/34* (2006.01)
*B64C 29/02* (2006.01)
*B64D 17/80* (2006.01)
*G05D 1/00* (2006.01)
*G05D 1/08* (2006.01)

(52) U.S. Cl.
CPC ........... *B64D 17/80* (2013.01); *G05D 1/0055* (2013.01); *G05D 1/0816* (2013.01); *G05D 1/0858* (2013.01); *B64C 2201/021* (2013.01); *B64C 2201/042* (2013.01); *B64C 2201/088* (2013.01); *B64C 2201/104* (2013.01); *B64C 2201/108* (2013.01); *B64C 2201/162* (2013.01); *B64C 2201/165* (2013.01)

(56) References Cited

U.S. PATENT DOCUMENTS

| | | | |
|---|---|---|---|
| 5,289,994 A | 3/1994 | Del Campo Aquilera | |
| 5,765,783 A * | 6/1998 | Albion | B64C 29/02 244/17.23 |
| 6,293,491 B1 * | 9/2001 | Wobben | B64C 27/00 244/17.23 |
| 7,159,817 B2 * | 1/2007 | VanderMey | B64C 29/0016 244/12.1 |
| 8,220,747 B2 | 7/2012 | Pastelak | |
| 8,220,748 B2 | 7/2012 | Fenton | |
| 8,220,749 B2 | 7/2012 | Pastelak | |
| 8,308,112 B2 | 11/2012 | Wood et al. | |
| 8,434,710 B2 * | 5/2013 | Hothi | B64C 39/024 244/17.23 |
| 8,473,124 B2 | 6/2013 | Shue et al. | |
| 8,800,931 B2 * | 8/2014 | Vander Lind | A63H 27/002 244/154 |
| 8,942,866 B2 | 1/2015 | Shue et al. | |
| 8,948,936 B2 | 2/2015 | Shue et al. | |
| 9,085,355 B2 * | 7/2015 | DeLorean | B64C 29/0033 |
| 9,126,675 B2 * | 9/2015 | Chubb | B64C 39/022 |
| 9,187,174 B2 * | 11/2015 | Shaw | B64C 27/28 |
| 9,193,458 B2 * | 11/2015 | Pongratz | B64C 37/02 |
| 9,199,733 B2 | 12/2015 | Keennon et al. | |
| 9,550,567 B1 * | 1/2017 | Erdozain, Jr. | B64C 29/02 |
| 9,645,582 B2 | 5/2017 | Shue | |
| 9,663,225 B1 | 5/2017 | Kooiman et al. | |
| 9,669,924 B2 * | 6/2017 | Chan | B64C 29/02 |
| 9,676,488 B2 * | 6/2017 | Alber | B64C 29/02 |
| 9,714,087 B2 * | 7/2017 | Matsuda | B64C 29/02 |
| 9,783,292 B2 | 10/2017 | Kooiman et al. | |
| 9,809,318 B1 | 11/2017 | Williams et al. | |
| 9,856,029 B2 | 1/2018 | King et al. | |
| 9,862,486 B2 * | 1/2018 | DeLorean | B64C 29/0033 |
| 9,868,541 B2 | 1/2018 | Kooiman et al. | |
| 9,868,542 B2 | 1/2018 | Williams et al. | |
| 9,908,615 B2 * | 3/2018 | Alber | B64C 13/16 |
| 9,975,644 B1 * | 5/2018 | Kimchi | B64D 35/04 |
| 9,994,313 B2 * | 6/2018 | Claridge | B64C 29/02 |
| 2005/0178879 A1 | 8/2005 | Mao | |
| 2006/0151666 A1 * | 7/2006 | VanderMey | B64C 29/0016 244/12.3 |
| 2010/0252690 A1 * | 10/2010 | Hothi | B64C 39/024 244/7 B |
| 2010/0283253 A1 * | 11/2010 | Bevirt | F03D 1/02 290/55 |
| 2010/0295320 A1 * | 11/2010 | Bevirt | B64C 39/022 290/55 |
| 2010/0295321 A1 * | 11/2010 | Bevirt | B64C 39/022 290/55 |
| 2011/0121570 A1 * | 5/2011 | Bevirt | F03D 5/06 290/44 |
| 2012/0261523 A1 * | 10/2012 | Shaw | B64C 29/0033 244/7 R |
| 2013/0200207 A1 * | 8/2013 | Pongratz | B64C 39/024 244/2 |
| 2014/0097290 A1 * | 4/2014 | Leng | B64C 29/0025 244/6 |
| 2014/0158816 A1 * | 6/2014 | DeLorean | B64C 29/0033 244/12.4 |
| 2014/0217229 A1 * | 8/2014 | Chan | B64C 29/02 244/6 |
| 2015/0014475 A1 | 1/2015 | Taylor et al. | |
| 2015/0076284 A1 * | 3/2015 | Chubb | B64C 39/022 244/1 TD |
| 2015/0076289 A1 * | 3/2015 | Chubb | B64C 39/022 244/76 R |
| 2015/0102157 A1 | 4/2015 | Godlasky et al. | |
| 2015/0274292 A1 * | 10/2015 | DeLorean | B64C 29/0033 244/6 |
| 2015/0284079 A1 * | 10/2015 | Matsuda | B64C 29/02 244/7 A |
| 2016/0214717 A1 | 7/2016 | de Silva | |
| 2016/0297520 A1 * | 10/2016 | Sada-Salinas | B64C 29/0025 |
| 2017/0217585 A1 * | 8/2017 | Hulsman | B64C 39/024 |
| 2018/0002003 A1 * | 1/2018 | Won | B64C 39/024 |

OTHER PUBLICATIONS

Aerovironment, "Drones and Data Analytics Commercial Information Solutions," http://www.avdroneanalytics.com/quantix, downloaded Feb. 28, 2018, pp. 1-10.

* cited by examiner

UAV WITH WING-PLATE ASSEMBLIES PROVIDING EFFICIENT VERTICAL TAKEOFF AND LANDING CAPABILITY

BACKGROUND

A conventional unmanned aerial vehicle (UAV) flies without input from a human passenger pilot. Rather, the UAV receives control from a preloaded flight plan or from a human on the ground.

Some conventional winged UAVs include wings that generate lift. Other conventional helicopter-type UAVs receive lift from spinning rotor blades.

SUMMARY

It should be understood that there are deficiencies to the above-described conventional UAVs. Along these lines, the above-described conventional winged UAVs typically require runways to take off and land. Unfortunately, the need for such runways limits where the conventional UAVs take off and land, and the locations of the runways limits their areas of flight.

To alleviate the need for a runway, some conventional winged UAVs launch from launch ramps and/or return by flying into nets. However, these conventional winged UAVs have limited payload delivery options and require extra external launching and/or landing equipment, more setup time, training, and so on.

Additionally the above-described conventional helicopter-type UAVs operate less efficiently than winged UAVs. Accordingly, the above-described conventional helicopter-type UAVs typically provide less range of flight, fly slower in the horizontal direction, and have poorer fuel efficiency.

Improved techniques are directed to an unmanned aerial vehicle (UAV) which is equipped with wing-plate assemblies that extend from the UAV's primary wings. Such wing-plate assemblies not only enhance flight efficiency, but also are provisioned with propulsion units that can add positive lift and controllability to the UAV during particular times of operation such as takeoff and landing. Along these lines, the wing-plate assemblies operate to improve flight in a manner similar to that of winglets of conventional aircraft. Additionally, the wing-plate assemblies provide thrust to enable the UAV to take off and land vertically, thus alleviating the need for large runways.

One embodiment is directed to a UAV which includes a fuselage and primary wings extending from the fuselage and providing lift to the UAV while the UAV is in horizontal flight. The UAV further includes wing-plate assemblies that extend from the primary wings, each wing-plate assembly including a set of propulsion units. Each propulsion unit includes (i) a housing, (ii) a motor disposed within that housing, and (iii) a propeller coupled to that motor.

In some arrangements, the wing-plate assemblies provide lift to the UAV during vertical flight and improve flight efficiency and/or control during horizontal flight.

In some arrangements, the primary wings include a left wing having a proximal end that attaches to a left side of the fuselage and a distal end, and a right wing having a proximal end that attaches to a right side of the fuselage and a distal end. In these arrangements, the wing-plate assemblies include a left wing-plate assembly that attaches to the distal end of the left wing, and a right wing-plate assembly that attaches to the distal end of the right wing.

In some arrangements, the left wing extends from the left side of the fuselage, and the right wing extends from the right side of the fuselage. In these arrangements, the left wing-plate assembly extends outwardly at an angle (e.g., at an acute angle, at an obtuse angle, perpendicularly, etc.) from the distal end of the left wing, and the right wing-plate assembly extends from the distal end of the right wing. Additionally, the left and right wing-plate assemblies support the left and right wings above a flat surface (e.g., the ground) such that the left and right wings are free of contacting the flat surface while the UAV is aimed in a vertical direction and sits on the flat surface. For example, the UAV is able to "sit" on its tail while resting on the flat surface. The landing gear are located in the aft end of the endplate mounted housings, allowing for lower drag for the landing gear in horizontal flight without requiring the landing gear to be retracted.

In some arrangements, each wing-plate assembly further includes a set of wing-plate control surfaces which is constructed and arranged to provide angular deflection and receive an airstream from the set of propulsion units of that wing-plate assembly. Example control surfaces include flaps, fins, rudders, and the like.

In some arrangements, the wing-plate assemblies further include respective sets of wheels constructed and arranged to roll over the flat surface. The respective sets of wheels provide mobility to the UAV while the UAV is not in flight (e.g., while the UAV is in the tail-sitting position).

In some arrangements, each propulsion unit further includes a rechargeable battery housed within the housing of that propulsion unit, the rechargeable battery being constructed and arranged to power the motor of that propulsion unit during takeoff and landing.

In some arrangements, the UAV further includes a main propulsion assembly which includes a fuel tank, an engine, and a main propeller. The engine drives the main propeller and consumes fuel from the fuel tank during flight. The main propulsion assembly is constructed and arranged to recharge the rechargeable battery of each propulsion unit during flight. Accordingly, the batteries do not need to be provided with enough combined capacity for both takeoff and landing, e.g., just enough power for takeoff since the batteries can then be recharged prior to landing.

In some arrangements, the motors of each propulsion unit are connected to multiple batteries connected in parallel, some of which may reside elsewhere within the UAV, allowing the motors to operate even if one or more batteries have failed. In other arrangements, the motors of the propulsion units may be powered by a single central battery. In each case, the batteries may be recharged by the main propulsion assembly or a power-generating unit.

In some arrangements, the UAV further includes a parachute assembly disposed with the fuselage. The parachute assembly is constructed and arranged to deploy a parachute in the event the propulsion units and the main propulsion assembly are unable to provide sufficient lift to safely land the UAV.

In some arrangements, the UAV further includes a set of ancillary propulsion units disposed along a leading edge of each primary wing. In certain arrangements, all of the propulsion units and the main propulsion assembly are constructed and arranged to provide at least 800 pounds of combined lift during takeoff. Such provisioning enables the UAV to carry large payloads, to carry large amounts of fuel for long endurance missions (e.g., flight durations over 8 hours), and to perform vertical takeoffs and landings.

In some arrangements, the propeller of each propulsion unit is a foldable (or retractable) propeller assembly. In these arrangements, the UAV may include a controller which folds the propeller of the foldable propeller assembly of each propulsion unit once the propeller of the propeller assembly is no longer in use, such as following attainment of horizontal flight by the UAV. Such folding may occur automatically due to biasing of the propeller blades when the propeller motor stops turning.

In some arrangements, the propeller of each propulsion unit is a passively foldable propeller assembly, where the propeller blades fold upon stoppage due to the dynamic pressure experienced during flight and thereby lowering the drag of the stopped propeller.

In some arrangements, the propulsion unit may have a ducted fan arrangement to increase thrust and reduce propeller noise. Such a ducted fan configuration is a suitable alternative to one in which certain propeller components are contained within, or external to, the propulsion enclosure (e.g., a nacelle).

In some arrangements, a UAV has a housing of at least one propulsion unit defining a shroud that partially encloses the propeller of that propulsion unit, the housing and the propeller forming a shrouded propeller unit (or ducted fan). Such a shrouded propeller configuration is a suitable alternative to one in which certain components are contained with an enclosure or are external to the enclosure (e.g., a nacelle).

It should be understood that the various features set forth herein may be used separately or together, in any combination, to provide various embodiments. Also, any of the features disclosed herein may be excluded from certain embodiments unless clearly required by those embodiments.

Another embodiment is directed to a method of operating a UAV which includes a fuselage, primary wings extending from the fuselage and providing lift to the UAV while the UAV is in horizontal flight, and wing-plate assemblies that extend from the primary wings, each wing-plate assembly including a set of propulsion units. The method includes operating the propulsion units of the wing-plate assemblies to provide additional lift during vertical flight, allowing the UAV to take off and land vertically.

Another embodiment is directed to a method of operating a UAV having (i) a fuselage defining a flight direction of the UAV and (ii) wing-plate assemblies that propel the UAV in the flight direction defined by the fuselage. The method includes, while the flight direction defined by fuselage of the UAV points vertically from a takeoff location on the ground, providing thrust from propulsion units of the wing-plate assemblies to fly the UAV along a vertical takeoff path. The method further includes, after the UAV flies along the vertical takeoff path, maneuvering the UAV to align the flight direction defined by fuselage of the UAV along a horizontal flight path that is perpendicular to the vertical takeoff path. The method further includes, after the UAV flies along the horizontal flight path, providing thrust from the propulsion units of the wing-plate assemblies to land the UAV along a vertical landing path that is perpendicular to the horizontal flight path.

It should be understood that a UAV as described in the various embodiments and arrangements herein may use wing-plate propulsion units to enable hover operation and maneuvering, outside of takeoff and landing operations.

Other embodiments are directed to electronic systems and apparatus, processing circuits, computer program products, processes, and so on. Some embodiments are directed to various methods, electronic components and circuitry which are involved in using wing-plate assemblies that enhance flight efficiency and enable vertical takeoff and landing.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Improved techniques are directed to an unmanned aerial vehicle (UAV) which is equipped with wing-plate assemblies that extend from the UAV's primary wings. Such wing-plate assemblies not only enhance flight efficiency, but also are provisioned with propulsion units that can add positive lift and controllability to the UAV during particular times of operation such as takeoff and landing. Additionally, the wing-plate assemblies provide thrust to enable the UAV to take off and land vertically thus alleviating the need for large runway areas.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
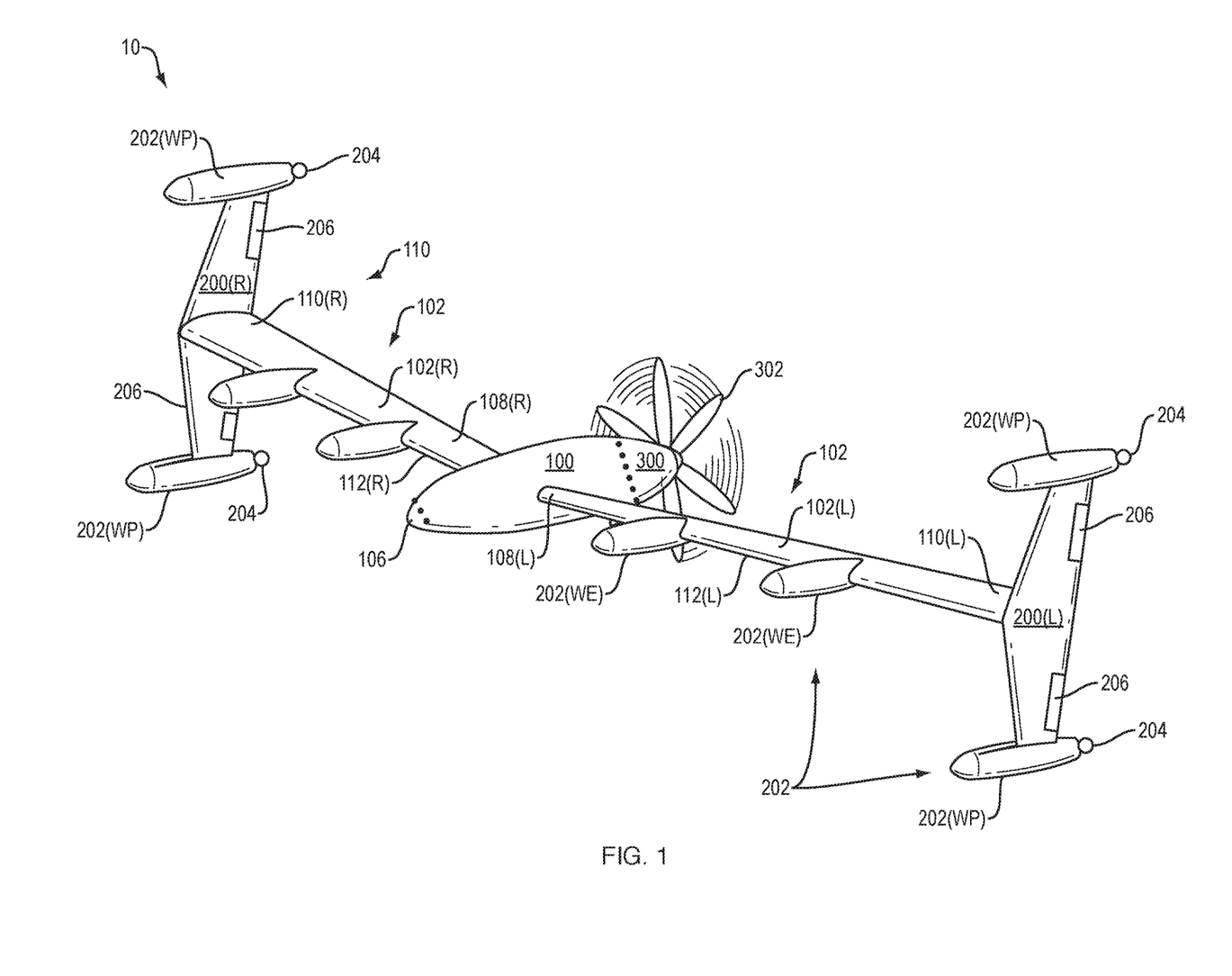
FIG. 1 is a perspective view of a UAV having wing-plate assemblies that provide thrust during vertical takeoff and landing.

FIG. 1 depicts a UAV 10. The UAV 10 includes a fuselage 100, a left wing 102(L), and a right wing 102(R) (collectively wings 102). The UAV 10 also includes a main propulsion assembly 300, a parachute assembly 106, and the wing-plate assemblies 200(L), 200(R) (collectively wing-plate assemblies 200).

Each wing 102 has a proximal end 108, a distal end 110, and a leading edge 112. That is, the wing 102(L) has a proximal end 108(L), a distal end 110(L), and a leading edge 112(L). Likewise, the wing 102(R) has a proximal end 108(R), a distal end 110(R), and a leading edge 112(R).

The proximal end 108 of each wing 102 is the end closest to the fuselage 100. The distal end 110 of each wing 102 is the end farthest from the fuselage 100. Each wing 102 meets the fuselage 100 at its proximal end 108. The wing-plate assemblies 200 extend from the distal end 110 of each wing 102. As shown in FIG. 1, such a feature forms a T-shaped or perpendicular formation by way of example.

Each wing-plate assembly 200 includes a set of wing-plate propulsion units 202(WP), the wheels 204, and the control surfaces 206. In some configurations, such as the one shown in FIG. 1, the UAV 10 includes the ancillary propulsion units 202(WE) disposed along the leading edges 112 of the wings 102.

Figures 2A, 2B, 2C:
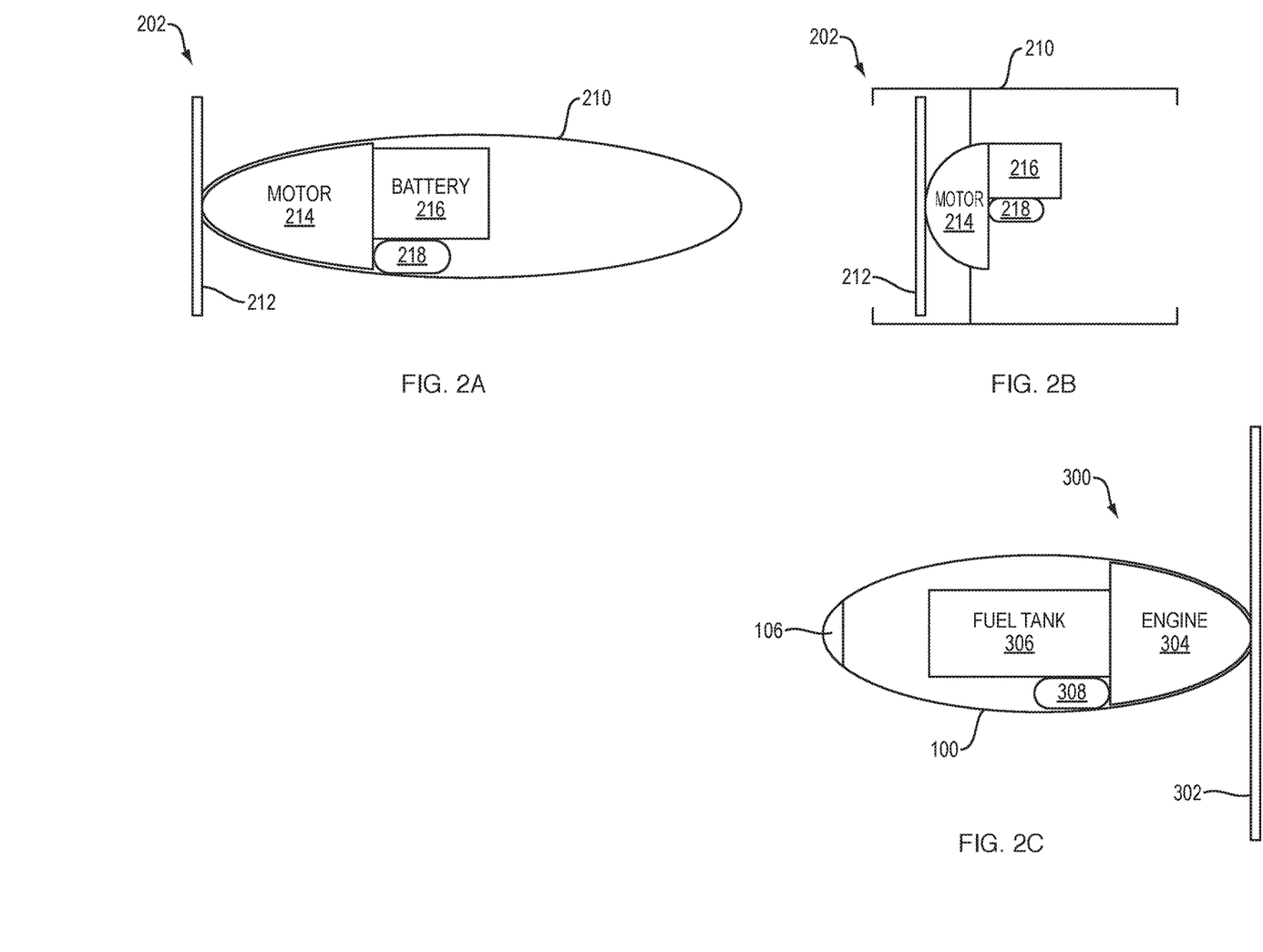
FIG. 2A is a cross-sectional schematic view of an example of a propulsion unit which is part of the UAV of FIG. 1.
FIG. 2B is a cross-sectional schematic view of another example of a propulsion unit which is part of the UAV of FIG. 1.
FIG. 2C is a cross-sectional schematic view of the fuselage and main propulsion assembly of the UAV of FIG. 1.

FIG. 2A is a schematic cross-sectional view of a propulsion unit 202. Each propulsion unit 202 includes a housing 210, a propeller 212, a motor 214, a battery 216, and control circuitry 218. The propeller 212 is connected to the motor 214. The motor 214 is powered by the battery 216. The motor 214, the battery 216, and the control circuitry 218 are disposed within the housing 210 (e.g., a nacelle). The propeller 212 is driven by the motor 214 and has its rate of rotation controlled by control circuitry 218. In some arrangements, the propeller 212 is hinged such that it rests against the housing 210 when it is not in operation and is automatically deployed by the effective centrifugal force on the propeller 212 resulting from the rotation of the propeller 212 by the motor 214. In other arrangements, the propeller may be retracted into the housing when it is not in operation.

FIG. 2B is a schematic cross-sectional view of a propulsion unit 202 configured as a shrouded propeller (or ducted fan). As in FIG. 2A described above, the propulsion unit 202 includes a housing 210, a propeller 212, a motor 214, a battery 216, and control circuitry 218. The propeller 212 is connected to the motor 214, which is supported inside the housing 210 (e.g., a shroud or duct). In some arrangements, such a shrouded propeller can provide greater thrust at low speed when compared to an exposed propeller of similar size, reduce noise, and improve safety when the UAV is near personnel or structures. In some arrangements, the shrouded propeller is gimballed to allow control of the thrust direction.

FIG. 2C is a schematic cross-sectional view of the fuselage 100 and the main propulsion assembly 300. The main propulsion assembly 300 includes a main propeller 302, an engine 304, a fuel tank 306, and control circuitry 308. The main propeller 302 is coupled to the engine 304 which receives fuel from the fuel tank 306. The engine 304, the fuel tank 306, and the control circuitry 308 reside within the fuselage 100. The parachute assembly 106 is also housed within the fuselage 100, and deploys a parachute in certain situations (e.g., an emergency landing situation, due to unexpected loss of lift, etc.).

At this point, one should appreciate that the geometry of the UAV 10 defines a flight (or forward flying) direction. In particular, the aerodynamic surfaces formed by the fuselage 100, the wings 102, the wing-plate assemblies 200, etc. define this direction. In some arrangements, the flight direction aligns with the axis for the propeller 302 (e.g., where the propeller 302 is at the tail of the UAV 10 and the parachute assembly 106 is at the front or nose of the UAV 10).

Figure 3:
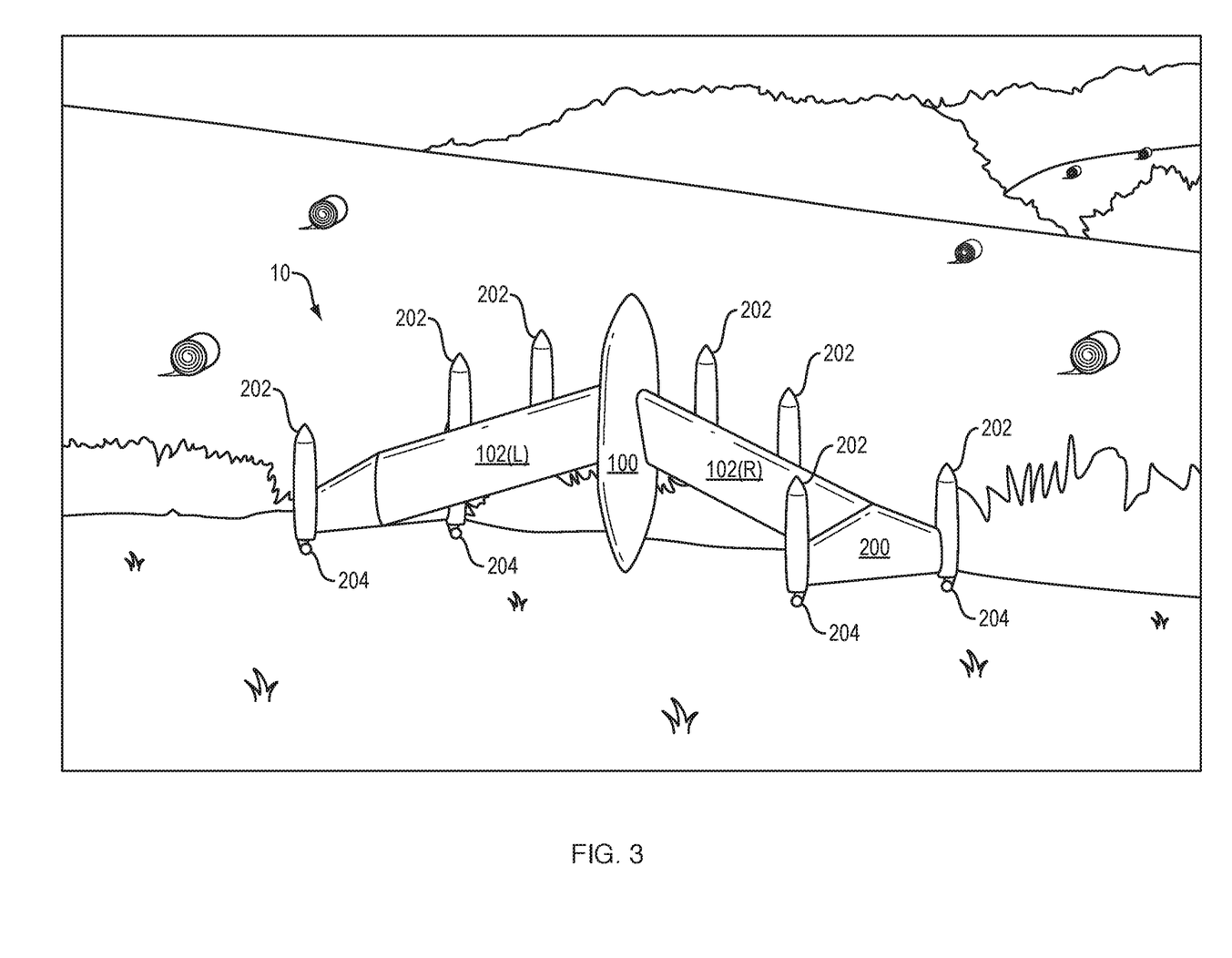
FIG. 3 is a perspective view of the UAV of FIG. 1 positioned in preparation for a vertical takeoff.

FIG. 3 depicts the UAV 10 at rest in an upright position, either in preparation for vertical takeoff or after a vertical landing. In some arrangements, the UAV 10 is supported in the upright position by the wheels 204 of the wing-plate assemblies 200. The wheels 204 permit rolling of the UAV 10 from one location to another (e.g., from a transport vehicle to a flat ground location for takeoff, from a landing location back onto the transport vehicle, etc.).

Figure 4A:
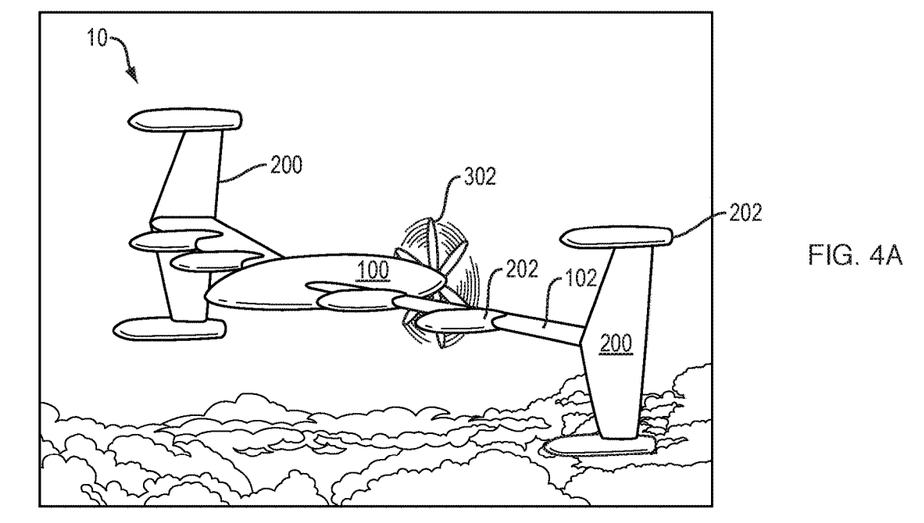
FIG. 4A is a perspective view of the UAV of FIG. 1 during horizontal flight powered by the main propulsion unit.

FIG. 4A depicts the UAV 10 in horizontal flight powered by the main propeller 302 belonging to the main propulsion assembly 300. The wing-plate propulsion units 202(WP) and the wing-edge propulsion units 202(WE) are depicted with their propellers 204 retracted. Here, the main propulsion assembly 300 alone provides sufficient thrust to maintain UAV flight.

Figure 4B:
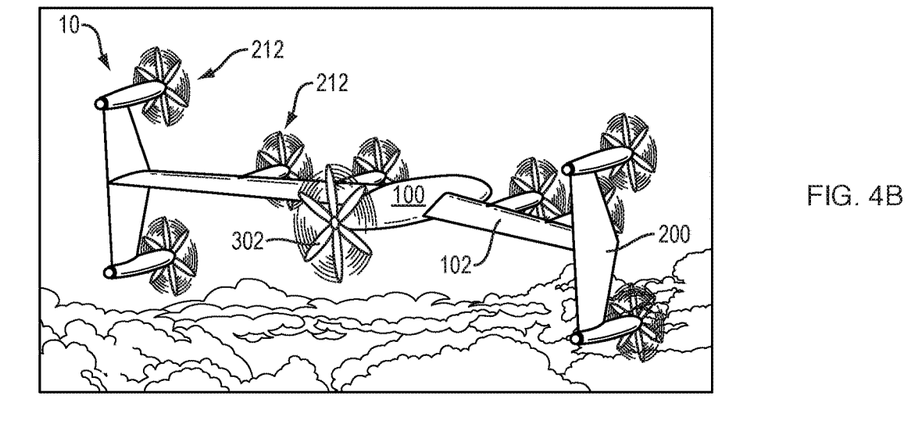
FIG. 4B is a perspective view of the UAV of FIG. 1 during horizontal flight powered by the main propulsion unit as well as additional propulsion units mounted on the wings.

FIG. 4B depicts the UAV 10 in horizontal flight powered by the main propeller 302 and powered additionally by the wing-plate propulsion units 202(WP) and the wing-edge propulsion units 202(WE), depicted with their respective propellers 204 deployed. Here, the combination of the main propulsion assembly 300 and the other propulsion units 202 provides thrust for UAV flight. In this situation, the UAV 10 may perform certain advanced maneuvers such as flying at maximum speed, flying at steep rates of ascent, and so on.

Figure 5A:
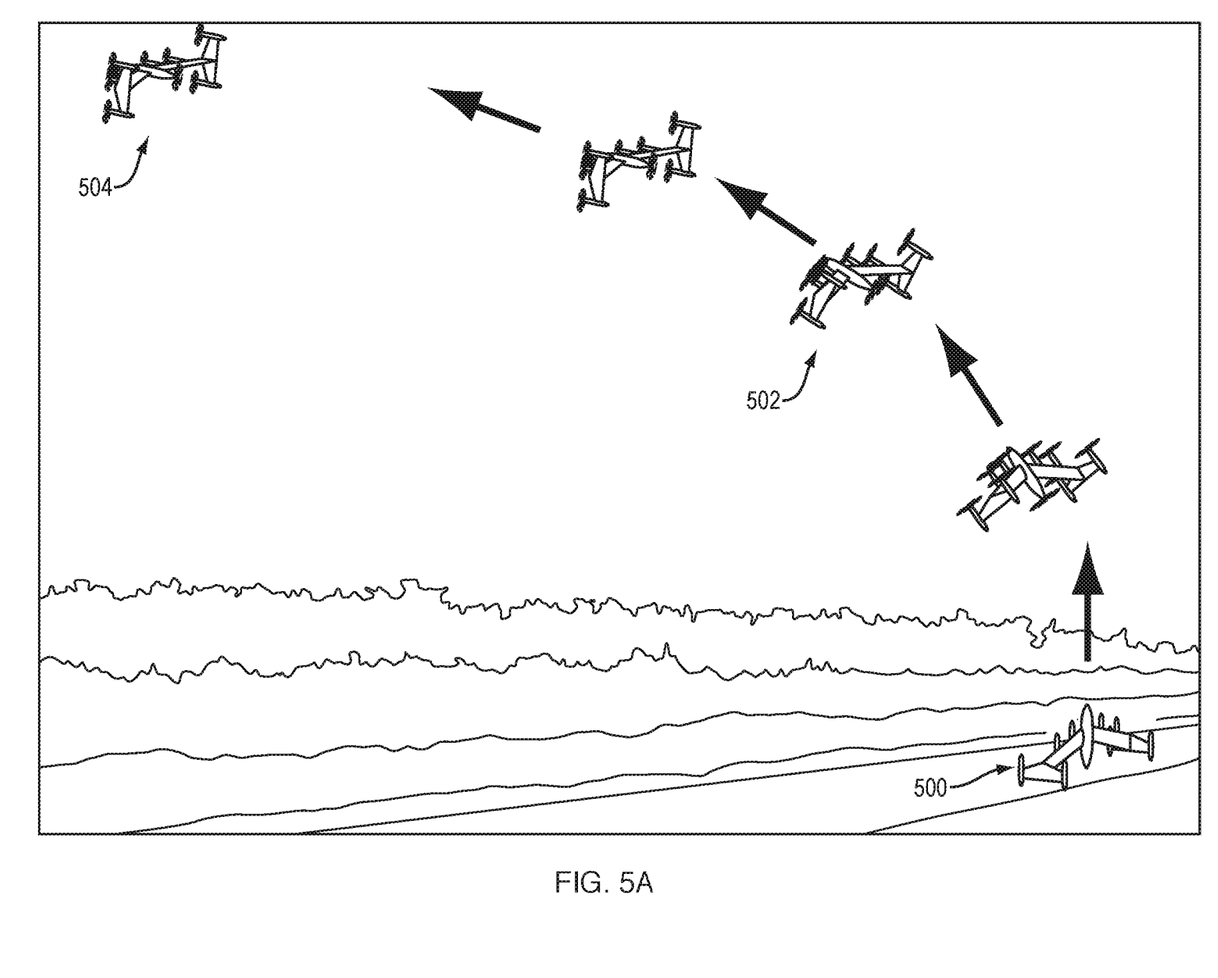
FIG. 5A is a perspective view of the UAV of FIG. 1 performing a vertical takeoff and transition to horizontal flight.

FIG. 5A depicts the UAV 10 performing an example vertical takeoff sequence. The UAV 10 starts in upright position at location 500, as previously depicted in FIG. 3. At location 502, the UAV 10 smoothly transitions from a purely vertical direction toward a horizontal flight direction, powered by the main propulsion unit 300, with the propeller 302 and further powered by the wing-plate propulsion units 202(WP) and the wing-edge propulsion units 202(WE), with their respective propellers 204. The propulsion units 202 can be powered individually to improve flight control while rotating the UAV 10 (e.g., with certain of the propulsion units 202 providing more thrust than others of the propulsion units 202 to facilitate transition to the horizontal orientation). At position 504, the UAV 10 maintains a flight direction powered only by the main propulsion assembly 300, with the propeller 302.

Figure 5B:
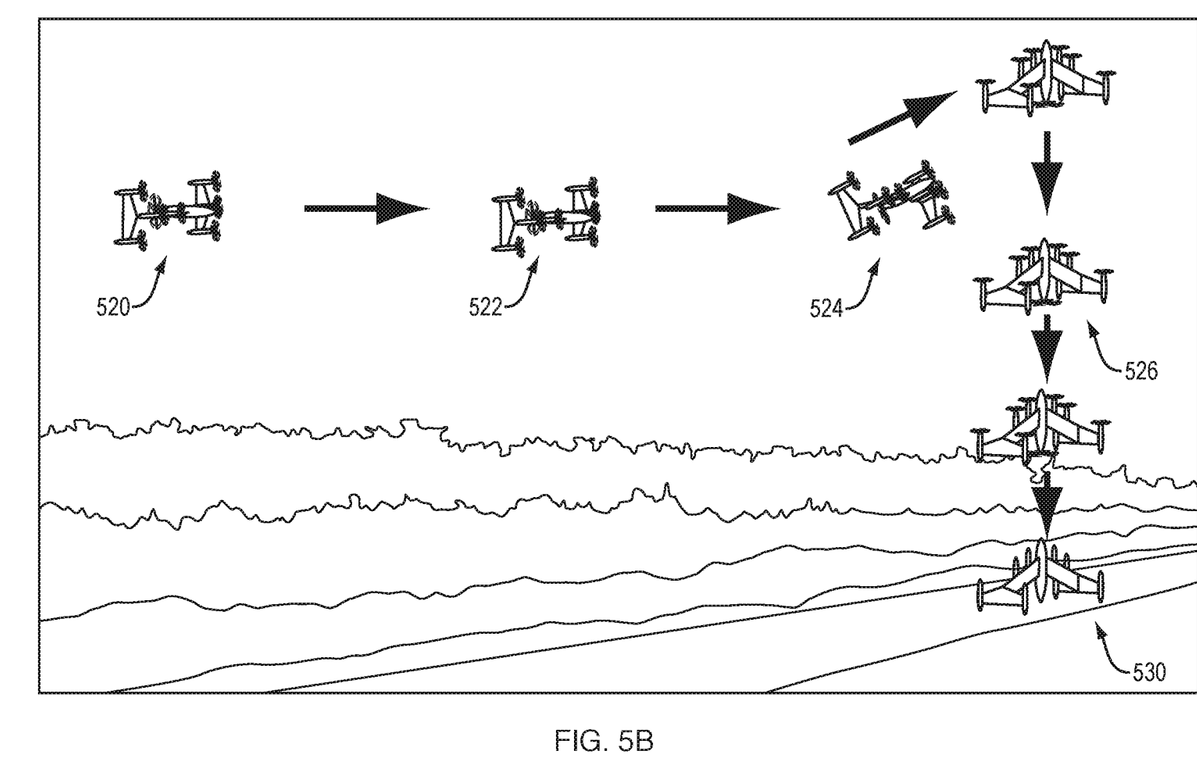
FIG. 5B is a perspective view of the UAV of FIG. 1 transitioning from horizontal flight and performing a vertical landing.

FIG. 5B depicts the UAV 10 performing an example vertical landing sequence. Here, the UAV 10 initially flies in a horizontal direction at location 520, powered by the main propulsion unit 300. At location 524, the UAV 10 flies in a horizontal direction powered by both main propulsion unit 300 and the wing-plate and wing-edge propulsion units 202, preparing to rotate toward a vertical flight direction, as depicted at location 524. At location 526 the UAV 10 descends.

It should be understood that various complex maneuvers are available to the UAV 10. For example, operating each of the two propulsion units 202 belonging to a single wing-plate assembly 200 at a different rotational speed with respect to the other efficiently rotates the UAV 10. It should be understood that appropriately controlling the rotational speeds of the various propulsion units 202, and operating the control surfaces 206, enables control of the pitch, roll, and yaw of the UAV 10.

Figure 6A:
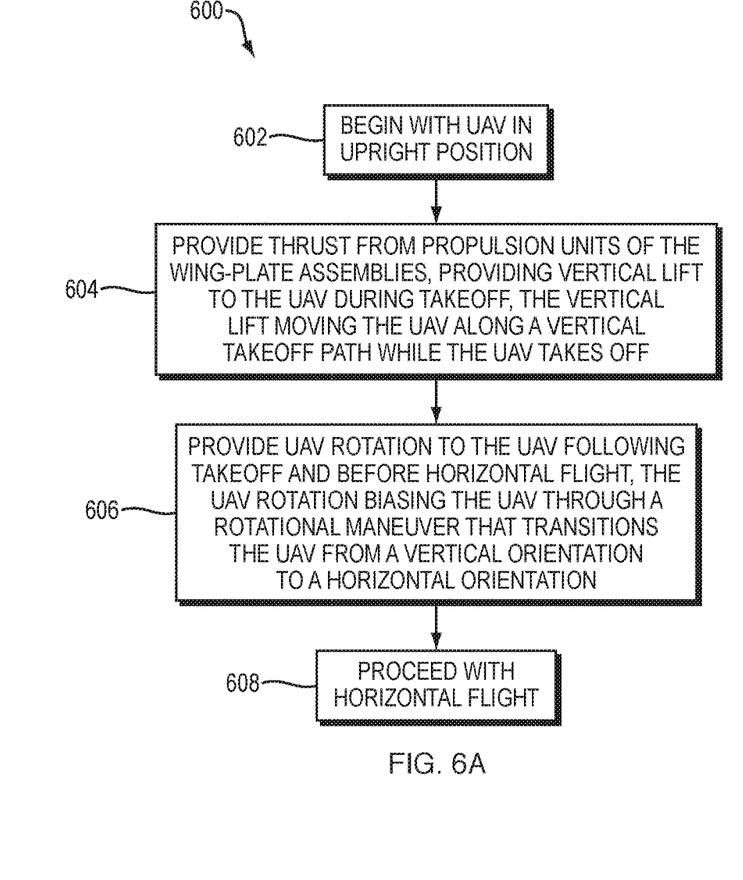
FIG. 6A is a flow-chart describing an example vertical takeoff procedure.

FIG. 6A is a flowchart of a vertical takeoff procedure 600 including steps 602, 604, 606, and 608. Vertical takeoff procedure 600 begins at step 602 with the UAV 10 in an upright position. At step 604, the propulsion units 202 of the wing-plate assemblies 200 provide thrust to fly the UAV 10 along a vertical takeoff path. At step 606 the UAV 10 maneuvers to align the flight direction along a horizontal path that is perpendicular to the vertical takeoff path. At step 608 the UAV 10 flies along a horizontal flight path.

Figure 6B:
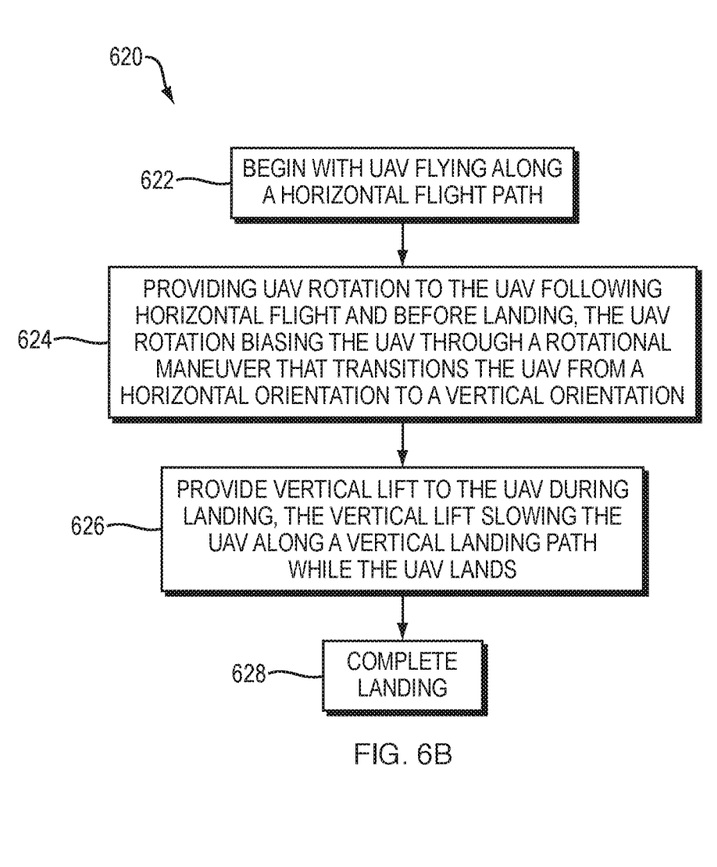
FIG. 6B is a flow-chart describing an example vertical landing procedure.

FIG. 6B is a flowchart of a vertical landing procedure 620 including steps 622, 624, 626, and 628. Vertical takeoff procedure 620 begins at step 622. The UAV 10 flies along a horizontal flight path. At step 624 the UAV 10 maneuvers to align the flight direction along a vertical flight path that is perpendicular to the horizontal flight path, e.g., via use of control surfaces and/or varying thrust from the propulsion units 202. At step 626, the propulsion units 202 provide thrust to slow the UAV 10 along the vertical flight path. At step 628 the UAV 10 continues to descend and lands.

One should appreciate that the wing-plate assemblies 200 reduce aerodynamic drag of the UAV 10 via partial recovery of vortex energy at the ends of the primary wings 102. Accordingly, the UAV 10 flies with greater aerodynamic efficiency than a conventional vehicle of similar dimensions, resulting in greater fuel efficiency. In certain arrangements, the propulsion units 202 attached to the wing-plate assemblies 200 may be used for horizontal flight. By using proper rotational direction of the propellers 212, further recovery of vortex energy of the primary wings 102 is possible which will result in additional flight efficiency.

Furthermore, presence of the wing-plate assemblies 200 improves handling of the UAV 10 and enhances safety. For example, the propulsion units 202 are able to blow air over the control surfaces 206 for added UAV flight control.

One should appreciate that the UAV configurations disclosed herein combine the vertical takeoff and landing capability of a multi-rotor vehicle with the efficiency of a fixed wing aircraft. Advantageously, in some embodiments, the propulsion units 202 are mounted on wing-plate assemblies (e.g., versus inboard on other UAVs).

It should be understood that the UAV 10 may have a swept wing configuration that uses distributed electric propulsion along the leading edges 112 of the wings 102, with additional electric propulsion units 202 mounted on the wing-plate assemblies 200 at the distal ends 110 of each wing 102. The UAV 10 sits vertically on the ground with the leading edge 112 of each of the wings 102 up. The electric propulsion units 202, combined with the main propulsion assembly 300 of the UAV 10, provides sufficient thrust to allow for vertical takeoff and landing. Once transitioned to cruise altitude, the electric motors 214 can be shut off.

Some arrangements do not have a main propulsion unit 300. For some arrangements, propulsion units disposed along the wing edges and/or wing-plates provide sufficient thrust for main propulsion.

It should be understood that thrust for cruising may come from a variety of sources. In some arrangements, wing-edge propulsion units 202(WE) provide thrust to the UAV 10 while cruising. In other arrangements, the wing-plate assembly propulsion units alone provide thrust to the UAV 10 while cruising. In still other arrangements, a combination of wing edge and wing-plate propulsion units 202(WE) and 202(WP) provide thrust to the UAV 10 while cruising.

Using such wing-plate assemblies 200 increases the effective wing span of the aircraft (reduces overall drag) and provides locations to mount additional electric propulsion units 202. Such propulsion units 202 can provide pitch, roll, and yaw control during the vertical takeoff and landing (VTOL) phases. Such propulsion units 202 may also provide thrust over tip mounted rudders and wing tip elevons, which also can aid in control of the vehicle. If desired, the tip mounted electric propulsion units 202 can be used in cruise flight and with prop rotation of the propellers 212 (i.e., with the propellers 212 extended rather than retracted), to reduce wing tip losses and improve the aerodynamic efficiency.

While various embodiments of the present disclosure have been particularly shown and described, it will be understood by those skilled in the art that various changes in form and details may be made therein without departing from the spirit and scope of the present disclosure.

For example, all the propulsion units may be powered by electrically by batteries, or by electrical power generated by a fuel-powered turbine. Alternatively, all the propulsion units may be driven hydraulically. In different arrangements, UAVs have various permutations/combinations/configuration/etc. of electrically-powered propulsion units, hydraulically-driven propulsion units, and combustion-driven propulsion units, and so on.

Furthermore, the techniques disclosed herein are suitable for use by other types of vehicles such as manned aircraft. Along these lines, although the UAVs 10 are smaller than conventional passenger planes, it should be understood that one or more of the features disclosed herein can be applied to conventional passenger planes to improve flight efficiency and/or control. Such modifications and enhancements are intended to belong to various embodiments of the disclosure.

What is claimed is:

1. An unmanned aerial vehicle (UAV), comprising:
   a fuselage;
   primary wings extending from the fuselage and providing lift to the UAV while the UAV is in horizontal flight; and
   wing-plate assemblies that extend from the primary wings, each wing-plate assembly including a set of propulsion units, each propulsion unit including (i) a housing, (ii) a motor disposed within that housing, and (iii) a propeller coupled to that motor;
   wherein each propulsion unit further includes:
      a rechargeable battery, the rechargeable battery being constructed and arranged to i) store enough power to solely power the motor of that propulsion unit during vertical takeoff, and ii) recharge during horizontal flight of the UAV from a separate and independent main propulsion unit that maintains horizontal flight of the UAV.

2. A UAV as in claim 1 wherein the housing of at least one propulsion unit defines a shroud that partially encloses a propeller, the housing and the propeller forming a shrouded propeller unit.

3. A UAV as in claim 1, further comprising:
   wherein the main propulsion unit includes a fuel tank, an engine, and a main propeller, the engine driving the main propeller and consuming fuel from the fuel tank during horizontal flight; and
   wherein the main propulsion unit is constructed and arranged to recharge the rechargeable batteries during horizontal flight.

4. A UAV as in claim 1, further comprising:
   wherein the main propulsion unit includes a fuel tank, an engine, and a main propeller, the engine driving the main propeller and consuming fuel from the fuel tank during horizontal flight; and
   wherein the set of propulsion units in each one of the wing-plate assemblies comprises a plurality of propulsion units.

5. A UAV as in claim 1, wherein the main propulsion unit that is separate and independent from the propulsion units provides sufficient thrust to maintain horizontal flight of the UAV.

6. A UAV as in claim 1 wherein the wing-plate assemblies provide lift to the UAV during vertical flight.

7. A UAV as in claim 6 wherein the propeller of each propulsion unit is a foldable propeller assembly; and wherein the UAV further comprises:
a controller which directs the foldable propeller assembly of each propulsion unit to fold following attainment of horizontal flight by the UAV.

8. A UAV as in claim 1 wherein the primary wings include:
a left wing having a proximal end that attaches to a left side of the fuselage and a distal end, and
a right wing having a proximal end that attaches to a right side of the fuselage and a distal end; and
wherein the wing-plate assemblies include:
a left wing-plate assembly that attaches to the distal end of the left wing, and
a right wing-plate assembly that attaches to the distal end of the right wing.

9. A UAV as in claim 8 wherein the left wing extends from the left side of the fuselage;
wherein the right wing extends from the right side of the fuselage;
wherein the left wing-plate assembly extends from the distal end of the left wing;
wherein the right wing-plate assembly extends from the distal end of the right wing; and
wherein the left and right wing-plate assemblies support the left and right wings above a flat surface such that the left and right wings are free of contacting the flat surface while the UAV is aimed in a vertical direction and sits on the flat surface.

10. A UAV as in claim 9 wherein each wing-plate assembly further includes:
a set of wing-plate control surfaces which is constructed and arranged to provide angular deflection and receive an airstream from the set of propulsion units of that wing-plate assembly.

11. A UAV as in claim 9 wherein the wing-plate assemblies further include:
respective sets of wheels constructed and arranged to roll over the flat surface, the respective sets of wheels providing mobility to the UAV while the UAV is not in flight.

12. A UAV as in claim 1 wherein the rechargeable battery of each propulsion unit is housed within the housing of that propulsion unit.

13. A UAV as in claim 12, further comprising:
wherein the main propulsion unit includes a fuel tank, an engine, and a main propeller, the engine driving the main propeller and consuming fuel from the fuel tank during horizontal flight; and
wherein the main propulsion unit is constructed and arranged to recharge the rechargeable battery of each propulsion unit during horizontal flight.

14. A UAV as in claim 13, further comprising:
a parachute assembly disposed within the fuselage, the parachute assembly being constructed and arranged to deploy a parachute in the event the propulsion units and the main propulsion assembly are unable to provide sufficient lift to safely land the UAV.

15. A UAV as in claim 13, further comprising:
a set of ancillary propulsion units disposed along a leading edge of each primary wing; and
wherein all of the propulsion units and the main propulsion assembly are constructed and arranged to provide at least 800 pounds of combined lift during takeoff.

16. A UAV as in claim 1 wherein the set of propulsion units of each wing-plate assembly provides vertical lift to the UAV during takeoff, the vertical lift moving and controlling the UAV along a vertical takeoff path while the UAV takes off.

17. A UAV as in claim 16 wherein the sets of propulsion units of the wing-plate assemblies provide UAV rotation to the UAV following takeoff and before horizontal flight, the UAV rotation biasing the UAV through a rotational maneuver that transitions the UAV from a vertical orientation to a horizontal orientation.

18. A UAV as in claim 1 wherein the set of propulsion units of each wing-plate assembly provides vertical lift to the UAV during landing, the vertical lift slowing the rate of descent of the UAV and controlling the UAV along a vertical landing path while the UAV lands.

19. A UAV as in claim 18 wherein the sets of propulsion units of the wing-plate assemblies provide pitch, directional control, and UAV rotation to the UAV following horizontal flight and before landing, the UAV rotation biasing the UAV through a rotational maneuver that transitions the UAV from a horizontal orientation to a vertical orientation.

20. A method of operating an unmanned aerial vehicle (UAV) having (i) a fuselage defining a flight direction of the UAV and (ii) wing-plate assemblies that propel the UAV in the flight direction defined by the fuselage, each wing plate assembly including a set of propulsion units, each propulsion unit including (i) a housing, (ii) a motor disposed within that housing, (iii) a propeller coupled to that motor, and (iv) a rechargeable battery, the rechargeable battery being constructed and arranged to i) store enough power to solely power the motor of that propulsion unit during vertical takeoff, and ii) recharge during horizontal flight of the UAV from a separate and independent main propulsion unit that maintains horizontal flight of the UAV, the method comprising:
while the flight direction defined by fuselage of the UAV points vertically from a takeoff location on the ground, providing thrust from propulsion units of the wing-plate assemblies to fly the UAV along a vertical takeoff path;
after the UAV flies along the vertical takeoff path, maneuvering the UAV to align the flight direction defined by fuselage of the UAV along a horizontal flight path that is perpendicular to the vertical takeoff path, and recharging the rechargeable battery of each propulsion unit in the wing-plate assemblies, during horizontal flight of the UAV, from the separate and independent main propulsion unit that maintains horizontal flight of the UAV; and
after the UAV flies along the horizontal flight path, providing thrust from the propulsion units of the wing-plate assemblies to land the UAV along a vertical landing path that is perpendicular to the horizontal flight path.

21. A method as in claim 20 wherein providing thrust from the propulsion units of the wing-plate assemblies to fly the UAV along the vertical takeoff path includes:
using the propulsion units of the wing-plate assemblies to provide vertical lift to the UAV during takeoff, the vertical lift moving the UAV along the vertical takeoff path while the UAV takes off, and
using the propulsion units of the wing-plate assemblies to provide UAV rotation to the UAV following takeoff and before horizontal flight, the UAV rotation biasing the UAV through a rotational maneuver that transitions the UAV from a vertical orientation to a horizontal orientation.

22. A method as in claim 21 wherein providing thrust from the propulsion units of the wing-plate assemblies to land the UAV along the vertical landing path that is perpendicular to the horizontal flight path includes:
   using the propulsion units of the wing-plate assemblies to provide UAV rotation and directional control to the UAV following horizontal flight and before landing, the UAV rotation biasing the UAV through a rotational maneuver that transitions the UAV from a horizontal orientation to a vertical orientation, and
   using the propulsion units of the wing-plate assemblies to provide vertical thrust to the UAV during landing, the vertical thrust slowing the UAV along the vertical landing path while the UAV lands.

* * * * *